United States Patent Office 3,582,372
Patented June 1, 1971

3,582,372
BINDER FOR REFRACTORY PRODUCTS
George H. Criss, Bethel Park, and George F. Carini,
Pittsburgh, Pa., assignors to Dresser Industries, Inc.,
Dallas, Tex.
No Drawing. Filed Aug. 22, 1968, Ser. No. 754,710
Int. Cl. C04b *35/04*
U.S. Cl. 106—55                                8 Claims

ABSTRACT OF THE DISCLOSURE

A refractory product with a binder consisting essentially of boron phosphate and up to 50%, by weight soluble sodium phosphate.

---

Refractory products are comprised of ceramic materials and are used to line furnaces and high temperature vessels. Refractories are provided in a variety of physical forms such as shapes and monoliths which include plastics, ramming mixes, gunning mixes, casting mixes, etc. Shapes, usually brick, may be ceramically bonded by burning at elevated temperatures or may be chemically bonded with various chemical binders which set upon drying or curing at relatively low temperatures. Monolithic refractory products, those shaped within the furnace, almost always have a chemical binder.

Binders used in refractory products includes, for example, hydraulic cements, lignosulfonate liquors, epsom salts, sodium silicates, phosphoric acid, sodium phosphate salts, and many others. Phosphate binders are of particular interest because in some products they provide outstanding room temperature and intermediate temperature strength and provide a product that is less easily wet and penetrated by the molten metals and slags which are present in industrial furnaces.

Phosphate binders used in refractory products include phosphoric acid, ammonium phosphate, aluminum phosphate, sodium phosphates, especially sodium phosphate, glasses, and other reactive salts.

Phosphoric acid as a binder almost without exception provides better strengths than any other phosphate. Phosphate salts, seldom if ever, are satisfactory in this respect. Phosphoric acid as a binder is also desirable because it does not add alkali or alkaline earths to the refractory which in the case of acid (silicate) refractories will form relatively low melting compounds. Unfortunately, phosphoric acid may be dangerous to work with and because of its reactivity it has unpredictable and rapid setting characteristics. Ammonium phosphate has been suggested as a phosphate binder especially for gunning purposes. It is soluble and does not introduce unwanted compounds into the refractory product. However, it has a very bad odor. Sodium phosphate salts have been used, especially as phosphate glasses. As pointed out, they introduce unwanted alkalies to the refractory product. Gunning mixes with sodium phosphate binders have a very narrow water range and high rebound losses.

According to this invention, there is provided a phosphate binder for refractory products that (a) provides strengths to refractory products substantially as good as phosphoric acid (b) adds a minimum of unwanted alkalies to the refractory product (c) does not have unpredictable and rapid setting characteristics and (d) when used in gunning, provides a mix with a wide water range and excellent rebound properties.

This invention is predicated upon the discovery that a binder comprising boron phosphate and up to 50% soluble sodium phosphate is especially suitable for refractory materials. Preferably, the sodium phosphate is sodium phosphate glass. By glass is meant that the phosphate contains no more than 5% water. Sodium phosphate glasses are available having $Na_2O$ to $P_2O_5$ ratios ranging from less than 1:1 to about 1.8:1 by weight. Preferably, the binder should analyze about 60 to 70% $P_2O_5$ less than 15% $Na_2O$ and the balance $B_2O_3$. Preferably, the binder is comprised of boron phosphate and sodium metaphosphate glass in a ratio of about 5:1 and in this instance the binder analyzes less than about 6% $Na_2O$. For most products such as brick or monoliths the binder should be present in amounts of from 2 to 10% by weight. In the case of a refractory mortar, however, the binder may be present up to 25% by weight of the mortar. When used as a binder for gunning mixes, the binder should preferably be present in amounts between about 2 and 10% by weight of the gunning mix.

The refractory products may be comprised of refractory aggregates, selected from the group of alumina, crude and calcined fire clay, crude and calcined bauxite, kyanite, dead burned magnesite, chrome ores, zirconia, zircon, and other refractory aggregates well known in the refractories art.

Further objects and advantages of this invention will become apparent from a study of the following detailed description which is made with reference to the examples. In the examples, all parts and percentages are given by weight. All sizings are measured by the Tyler standard screen series.

EXAMPLES 1, 2 and 3

Three sized-graded brick making batches were prepared respectively from calcined fire clay, calcined Alabama bauxite, and calcined Bayer alumina. The batches were sized so as least 30% by weight was substantially all minus 65 mesh. The remainder of the batches was minus 6 plus and 65 mesh. To these batches were added a binder consisting of 1% sodium phosphate and 5% boron phosphate, based on the total weight of the batch. The batches were tempered in a Muller-type mixer with sufficient tempering water (approximately 3 to 6%) to provide a pressable consistency. The batches were thereafter pressed into shapes on a power press at pressures of about 5,000 p.s.i. The shapes were dried overnight at about 250° F. Thereafter the shapes were tested for bulk density and modulus of rupture at elevated temperatures. A portion of the shapes were burned at Cone 18 and also tested for bulk density and modulus of rupture at elevated temperatures. The batches of the exemplary mixes are given in Table I along with the test results.

TABLE I

| Example | 1 | 2 | 3 |
|---|---|---|---|
| Batch, percent: | | | |
|   Calcined clay | 100 | | |
|   Calcined bauxite | | 100 | |
|   Calcined alumina | | | 100 |
| Binder added, percent: | | | |
|   Sodium phosphate | 1 | 1 | 1 |
|   Boron phosphate | 5 | 5 | 5 |
|   $Na_2O$ in binder, percent | 5.0 | 5.0 | 5.0 |
| Bulk density, p.c.f.: | | | |
|   Unburned | 138 | 162 | 188 |
|   Burned (cone 18) | 147 | 150 | 186 |
| Modulus of rupture, p.s.i.: | | | |
|   Unburned at, ° F.: | | | |
|     2,300 | 120 | 910 | 1,050 |
|     2,600 | 40 | 390 | 620 |
|   Burned at, ° F.: | | | |
|     2,300 | 2,120 | 2,260 | 2,090 |
|     2,600 | 120 | 1,080 | 830 |

Table I establishes that mixtures of boron phosphate and sodium phosphate are suitable binders for the manufacture of burned and unburned brick. Example 1 is a fireclay brick. Fireclay brick are seldom chemically bonded and seldom tested above 2500° F. While the strengths of the unburned brick were marginal, the strengths of the burned brick were good at 2300° F. If the binder had been sodium phosphate, even the burned brick would have marginal hot strength. The boron phosphate binder is initially low in detrimental alkalies and it appears that on burning it promotes a reduction in alkalies. The boron reacts to form volatile borates. Examples 2 and 3 are high alumina brick and have strengths comparable to high alumina brick with phosphoric acid binders.

EXAMPLES 4, 5, 6, 7 AND 8

Plastic ramming mixes were prepared from batches as shown in Table II. The batches comprise alumina, relatively pure, finely ground quartz, clay and kyanite. In Example 4, the binder is boron phosphate. In Examples 5, 6, and 7, the binder is a mixture of boron phosphate and sodium phosphate. Example 8 is included by way of comparison and has a phosphoric acid binder. These mixes were tempered with sufficient water to give them a good plastic ramming consistency, whereby they could be rammed or tamped into shape. The batches were pressed into shapes at about 3000 p.s.i. which has been found to be equivalent to ramming. They were thereafter dried overnight at about 250° F. and tested for modulus of rupture at room temperature and at 2500° F. The results of the testing are given in the following table.

TABLE II

| Example | 4 | 5 | 6 | 7 | 8 |
|---|---|---|---|---|---|
| Batch, percent: | | | | | |
| Alumina | 87 | 87 | 87 | 87 | 87 |
| Quartz | 5 | 5 | 5 | 5 | 5 |
| Clay | 3 | 3 | 3 | 3 | 3 |
| Kyanite | 5 | 5 | 5 | 5 | 5 |
| Binder added, percent: | | | | | |
| Boron phosphate | 6 | 4.9 | 4 | 1.1 | |
| Sodium phosphate | | 1.1 | 2 | 4.9 | |
| Phosphoric acid (85%) | | | | | 6.5 |
| Na$_2$O in binder, percent | | 5.5 | 10.0 | 25.0 | |
| Bulk density, p.c.f | 163 | 160 | 165 | 164 | 171 |
| Room temperature modulus of rupture after drying, p.s.i | 530 | 900 | 1,160 | 1,360 | 950 |
| Modulus of rupture at 2,500° F., p.s.i | 1,360 | 1,310 | 700 | 40 | 1,580 |

Table II establishes that boron phosphate and a mixture of sodium phosphate and boron phosphate are especially suitable as binders for plastic refractories. Example 7 which has more than 50% by weight of the binder sodium phosphate is not according to this invention. Notice that Example 7 had little strength at 2500° F. Examples 4, 5 and 6 according to this invention, however, had strengths substantially as good as those of Example 8 which had a phosphoric acid binder. Monolithic refractory mixes according to this invention can be conveniently prepared in dry form and shipped to the job site where they can simply be tempered with water before using. Example 8 having a phosphoric acid binder would have to be sent to the job site in two parts, that is, with the aggregate and phosphoric acid separated.

EXAMPLES 9, 10 AND 11

The novel binder according to this invention is especially suitable for gunning mixes. Gunning mixes comprising an aggregate of dead burned magnesite are considered to be most difficult to work with. The following three mixes, Examples 9, 10, and 11 are gunning mixes prepared from dead burned magnesite aggregate sized as shown in Table III. The mix includes a plasticizing agent which in this case is bentonite. Example 9 contains a binder according to this invention. Examples 10 and 11 are comparative examples not within the scope of this invention.

TABLE III

| Example | 9 | 10 | 11 |
|---|---|---|---|
| Batch, percent: | | | |
| Dead burned magnesite | 96 | 96 | 96 |
| Bentonite | 1 | 1 | 1 |
| Binders, percent: | | | |
| Sodium phosphate glass | 0.55 | 2.45 | 3 |
| Boron phosphate | 2.45 | 0.55 | |
| Na$_2$O in binder, percent | 5.5 | 25.0 | 32.0 |
| Rebound loss, percent | 5 | 20 | 38 |

The three exemplary mixes were gunned (pneumatically placed) on a test panel in a special testing room where the rebound losses could be gathered and measured. The rebound losses of Example 9 were only 5% which is low for any gunning mix and especially for dead burned magnesite gunning mixes. In Example 10, the binder is a mixture of sodium phosphate glass and boron phosphate. The sodium phosphate glass, however, exceeds 50% of the binder. Notice that the rebound loss is 20%, almost four times more than that of Example 9. The binder in Example 11 is sodium phosphate glass. The rebound loss for this example is 38%. In the gunning of refractory gunning mixes, water is added at the nozzle of the gunning device to give the gunning mix a consistency which will enable it to be plastered against the wall which is being installed or repaired. If too little water is added, the rebound loss increases and if too much water is added the gunning mix slumps away from the wall. Every mix has a workable water range. Example 11 having a sodium phosphate binder had a very narrow water range whereas Example 9 according to this invention had a wide water range which facilitates controlling the gunning.

In the foregoing examples, we have described the use of this type of binder in burned and unburned brick, plastic ramming mixes, and gunning mixes. It would now be obvious to one skilled in the art that this binder would be useful in the preparation of trowelling mixes, casting mixes, refractory mortars, and others.

While we do not completely understand the nature of our invention, we believe that boron phosphate provides a source of the phosphate radical in a form whereby it can combine with a refractory aggregate in a manner similar to phosphoric acid. We have found that boron phosphate alone is an excellent binder. However, a small amount of sodium phosphate has been found to improve the binder comprising boron phosphate. In fact, the best results are obtained when boron phosphate and sodium phosphate are used together in the ratio of about 5:1. It is believed that in some way the sodium phosphate increases the rate of dissolution of the boron phosphate.

Having thus described the invention with the detail and particularity required by the patent laws what is desired to have protected by Letters Patent are as follows:

We claim:

1. A refractory product consisting essentially of refractory aggregate and a binder, said binder consisting essentially of boron phosphate and up to about 50% by weight soluble sodium phosphate.

2. A product according to claim 1 in which the binder analyzes, by weight, about 60 to 70% P$_2$O$_5$, up to 15% Na$_2$O, and the balance B$_2$O$_3$.

3. A product according to claim 1 in which the soluble sodium phosphate is a glass.

4. A product according to claim 3 in which the ratio of boron phosphate to sodium phosphate in the binder is about 5:1.

5. A product according to claim 2 in which the binder analyzes less than about 6% by weight $Na_2O$.

6. A product according to claim 1 in which the binder is present in amounts up to 25% by weight of the total refractory product.

7. A product according to claim 1 in which the binder is present in amounts of from about 2 to 10% by weight of the total refractory product.

8. A refractory product according to claim 1 which comprises a refractory aggregate, selected from the group consisting of alumina, calcined and crude fireclay, calcined and crude bauxite, dead burned magnesite, chrome ore, zirconia, zircon and mixtures thereof.

References Cited

UNITED STATES PATENTS

| | | | |
|---|---|---|---|
| 2,375,638 | 5/1945 | Englund | 23—105 |
| 2,646,344 | 7/1953 | Kamlet | 23—105 |
| 3,278,320 | 10/1966 | Neely | 106—58 |

FOREIGN PATENTS

| | | | |
|---|---|---|---|
| 856,332 | 12/1960 | Great Britain | 23—105 |

JAMES E. POER, Primary Examiner

U.S. Cl. X.R.

106—57, 58, 59, 65